Dec. 9, 1941.  W. F. ALDER  2,265,767
BIMETALLIC HYGROMETER
Filed April 27, 1938   3 Sheets-Sheet 1

Inventor
WILLIAM F. ALDER
By Hazard and Miller
Attorneys

Dec. 9, 1941.  W. F. ALDER  2,265,767
BIMETALLIC HYGROMETER
Filed April 27, 1938   3 Sheets-Sheet 2
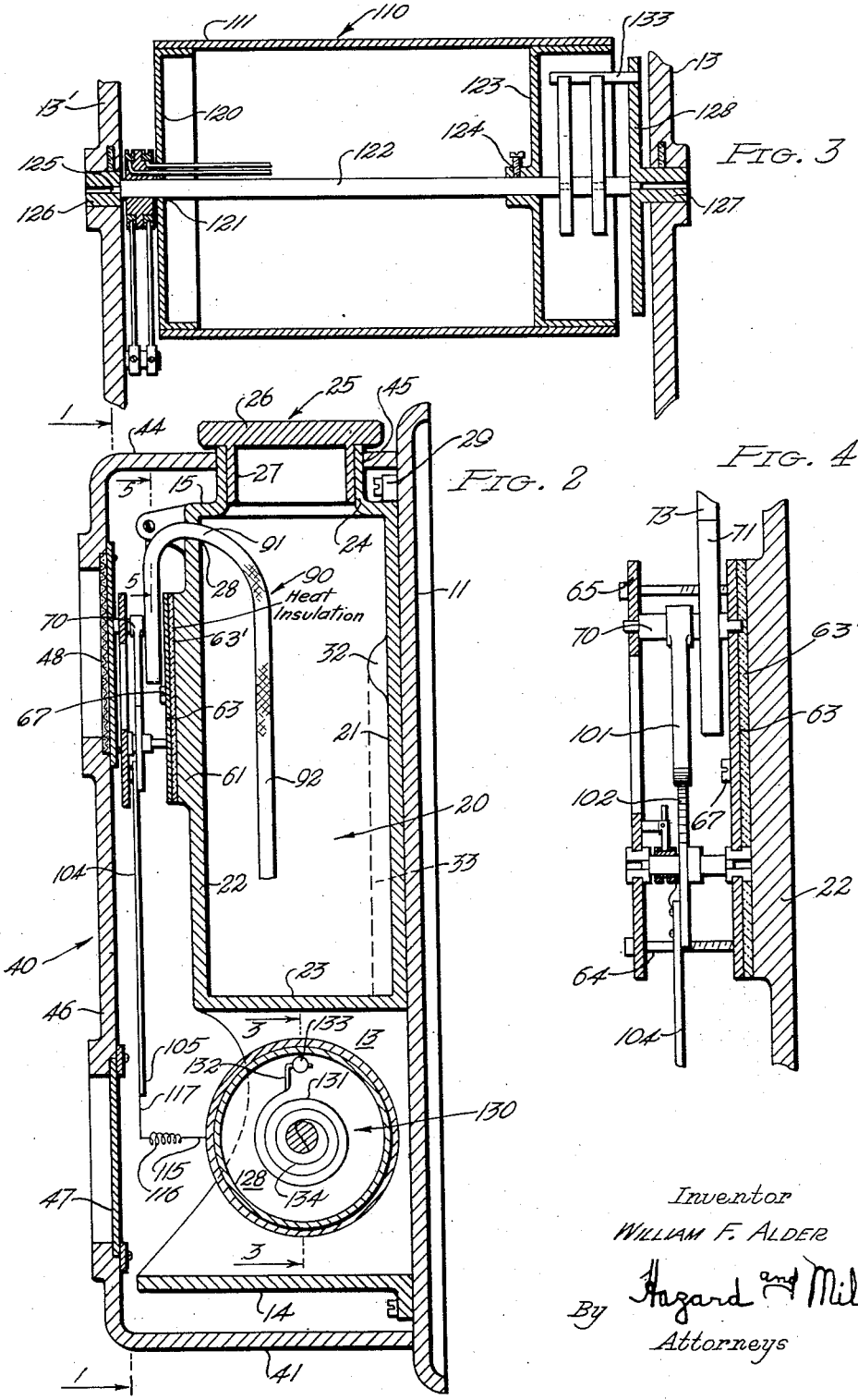
Inventor
WILLIAM F. ALDER
By Hazard and Miller
Attorneys

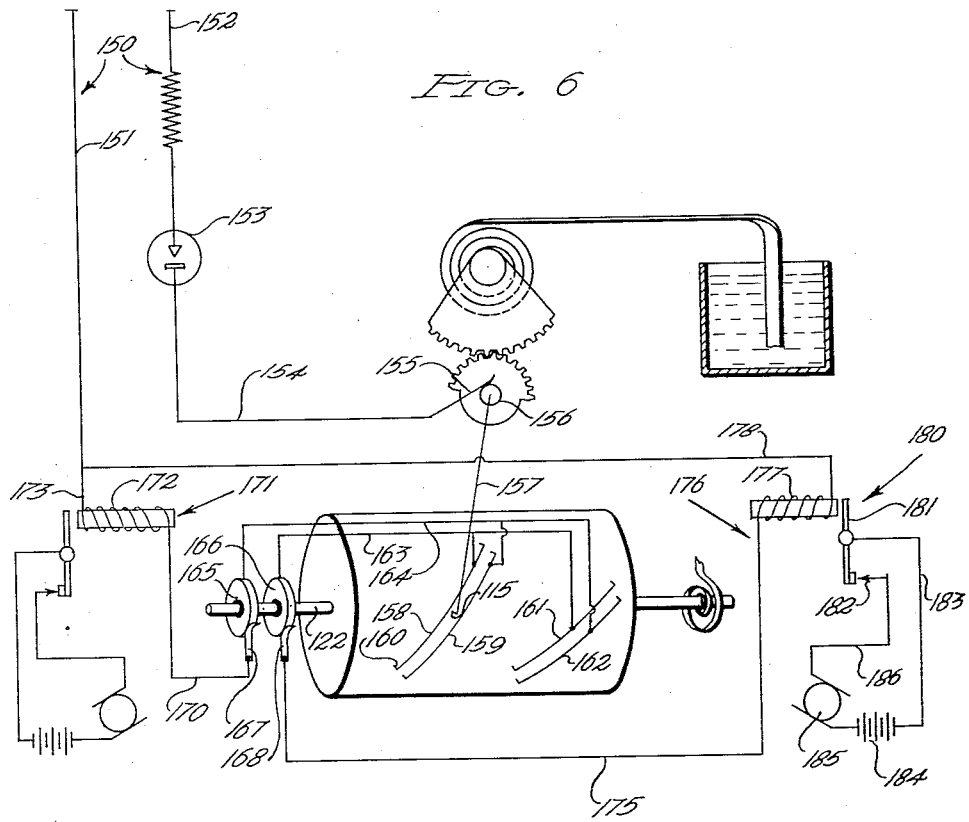

Patented Dec. 9, 1941

2,265,767

UNITED STATES PATENT OFFICE 2,265,767

BIMETALLIC HYGROMETER

William F. Alder, Altadena, Calif., assignor to Frank E. Wood, Monrovia, Calif., as trustee Application April 27, 1938, Serial No. 204,600

10 Claims. (Cl. 200—52)

I designate my invention as a bi-metallic hygrometer in that I actuate the indicating elements of the instrument by the thermal expansion and contraction of bi-metallic strips or the equivalent. Such elements co-relate the changes of temperature somewhat equivalent to hygrometric determinations by a so-called wet and dry bulb method. This invention may be considered as a simplification and a less expensive instrument than that described in my patent application for Electric hygrometer, Serial No. 110,131, filed November 10, 1936, Patent No. 2,177,630, issued October 31, 1939. My present invention utilizes a hygrometric chart mounted on a drum or forming part of a cylinder, this chart being provided with numerals or other insignia showing the relative humidity for different air temperatures. In conjunction with the chart I provide a pointer which may be moved over the chart, the pointer registering with the numerals and indicating the relative humidity at any definite temperature at any one time. As to these features this present application resembles my patent application above identified.

An object and feature of the present invention is to move the chart, that is, rotate this on its axis by the use of bi-metallic thermo-metric elements which on account of the unequal expansion develop a torque and thus rotate the shaft and hence the chart. Also another object of this invention is to move the pointer by rotating its pivot through the medium of bi-metallic expansive and contractive strips in which case it is preferable to operate the pointer through a gear system to obtain an increased arcuate angular movement of the pointer in reference to the angular movement developed by a pivot shaft connected to the second bi-metallic strips. It is believed obvious that either the first or the second set of strips may operate in accordance with the so-called wet bulb component of a hygrometric instrument in which the changes of temperature are governed in part by the evaporation of water.

A more detailed object and feature of my invention includes a mounting for the first bi-metallic elements for rotating the drum and chart and these being influenced solely by air temperatures irrespective of the humidity and in which case a registering or zero setting device is employed, this involving a movable support such as a pin on a setting disk, the other end of the coiled bi-metallic strips are directly connected to the shaft of the drum and therefore rotate the drum through various angular turns in accordance with changes of temperature either upwardly or downwardly considered in relation to the zero setting. A detailed feature of my invention in relation to the humidity regulation includes a mounting of the second set of bi-metallic strips with an adjustable support for the free ends, this being governed by micrometer adjustment screws. The opposite end preferably at the center of a spiral coil is connected to a rocking shaft. The coils of the second set are maintained in a moist condition by a wick extending into a reservoir of water so that the expansion and contraction of the coils of the second unit is regulated by the changes of temperature in conjunction with the evaporation of water from the exposed wick. A further detail feature in the humidity controlled unit consists of the employment of meshing segmental gears, one connected to the rock shaft and the other to a pivot shaft for the pointer so that an increased or magnified movement of the pointer is obtained.

Another object and feature of my invention is in the employment of the instrument to control the operation of secondary instruments in accordance with the changes of relative humidity and for such purpose I have an electrical control of for instance relays or the like in which conducting strips are mounted on the chart aligned with numerals showing substantially constant humidity through a temperature scale. The pointer is then provided with an electrical contact element which may engage the conductor or conductors and thus initiate the closing and opening of a first electric circuit which circuit may be utilized to operate one or more relays and thus control the operation of various air humidifying machines or the like. In this present construction I preferably arrange the strip conductors spaced apart on the chart to include between the strips satisfactory ranges of humidity change which do not require the actuation of the humidity control machines. However should the humidity become too high the pointer will contact one conductor and establish a first operative circuit and should the humidity fall too low, the pointer will contact a second conductor and establish a second control circuit.

My invention is illustrated in connection with the accompanying drawings, in which:

Fig. 2 is a vertical section taken substantially on the line 2—2 of Fig. 1 in the direction of the arrows.

Fig. 3 is a detail vertical section on the line 3—3 of Fig. 2 in the direction of the arrows through the chart drum, certain of the interior parts being shown in elevation.

Fig. 4 is a detail vertical section on the line 4—4 of Fig. 1 in the direction of the arrows.

Fig. 6 is a schematic drawing of the mechanical equipment together with an electrical wiring diagram.

Figure 1:
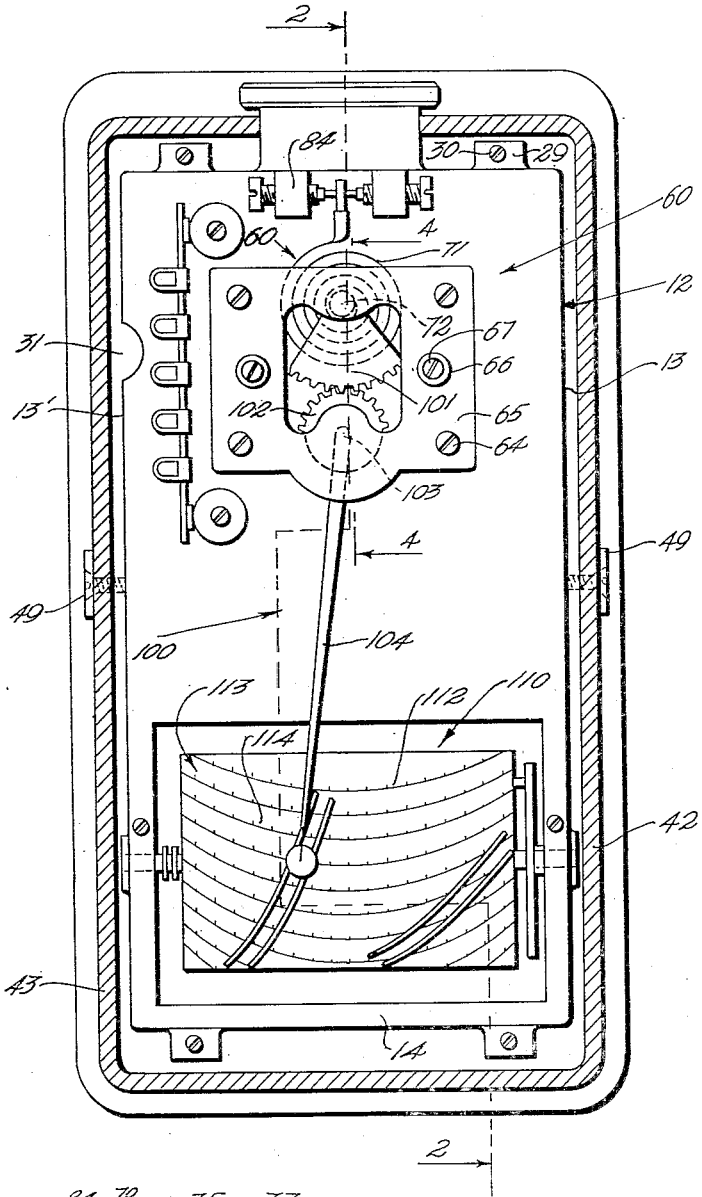
Fig. 1 is an elevational section taken on the section line 1—1 of Fig. 2 in the direction of the arrows, thus showing the interior of the instrument in elevation, the front portion of the cover being removed.
Figure 5:
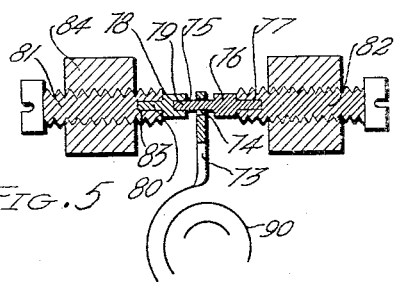
Fig. 5 is a detail vertical section on the line 5—5 of Fig. 2 in the direction of the arrows.

Referring first to the mechanical features depicted in Figs. 1 through 5, a wall plate 11 is indicated as the main supporting structure for the equipment, however it will be understood that any suitable type of supporting base may be utilized. To this wall plate which is preferably made of metal, I attach a frame 12. Such frame has vertical sides 13 and 13', a bottom plate 14 and a top 15. In this frame I construct a reservoir designated 20 which includes a back plate 21, a front plate 22, the reservoir bottom 23, there being a filling neck 24, this having a closure cap 25 provided with a head 26 and a sleeve 27. In the front plate there is an opening 28 adjacent the top. This front plate which forms a panel for supporting other parts of the instrument extends to the opposite sides 13 and 13' of the frame. The frame assembly with the reservoir is attached to the wall plate 11 by the medium of lugs 29 and attaching screws 30. The side 13' has a molded recess 31 extending from front to back and connecting with a horizontal back recess 32 from which there is a vertical recess 33 molded in the back 21 of the reservoir. These recesses are to accommodate electric wires. An enclosing cover 40 has a bottom 41, two opposite sides 42 and 43. The cover has a top 44 with an opening 45 to accommodate the filling neck 24. The front panel 46 of the cover is provided with a glass window 47 adjacent its lower portion and with a screen 48 fitted in an upper window. This screen provides for air circulation. The cover is attached to the frame structure 12 by screws 49 or the like on the sides. Such cover may be readily removed to inspect and adjust the equipment.

The humidity responsive assembly designated 60 employs a boss 61 on the front plate 22. A plate 63 is mounted on this boss being preferably spaced therefrom by a heat insulating strip 63'. By means of a series of screws or studs 64 with spacers, a front plate 65 is attached to the rear plate 63. The front plate has openings 66 through which the set screws 67 may be reached to attach this assembled frame to the boss 61.

A rock shaft 70 is journalled in the plates 63 and 65 to which shaft is connected a bimetallic thermal coil 71. This coil is in the form of a spiral and has its inner end 72 attached to the rock shaft. The free outer end 73 is bent outwardly, note particularly Fig. 5, and has an eye 74 formed in the end. This eye fits over a pin 75 mounted on the stud 76, the stud having a projection 77. A complementary stud 78 has a socket 79 in which the pin 75 fits. Such studs 78 also has a projecting end 80. By means of these projecting ends the studs are mounted in micrometer screws 81 and 82, each of which has a socket 83 and the screws are threaded through bosses 84 extending outwardly from the front plate 22. By this means the tension of the coil may be adjusted to position the rock shaft as desired so that a pointer, hereinafter described, may be adjusted to occupy the correct position in accordance with the humidity test when the instrument is set up. The coil 71 of the bimetallic thermostatic strip is covered with a wick 90, which wick has a portion 91 extending through the opening 28 in the upper part of the reservoir wall. A depending end 92 dips into the water in the reservoir. The exposed part of the wick is thus always maintained damp by the capillary action of the water flowing in the wick and is evaporated from this wick. It will be noted that the wick is directly exposed inside of the screen 48 and is thus subjected to the air of a room or the like and thus responsive to the temperature and humidity action.

The humidity-indicating mechanism designated by the numeral 100 includes a segmental gear 101 attached to the rock shaft 70. This gear meshes with a complementary segmental gear 102 which has its shaft 103 journaled in the plates 63 and 65. A pointer 104 is connected to the shaft 103, or for simplicity's sake, connected to an extension of the segmental gear 102. The lower end 105 on the pointer is visible through the window 47.

The temperature humidity chart assembly 110, note particularly Figs. 1, 2, and 3, employs a cylinder or drum 111 on the periphery of which is mounted a chart 112. This chart has temperature indicia and a scale of the relative humidities substantially the same as in my Patent No. 2,177,630, above identified. At the margins 113 are columns giving the temperatures. The humidity readings 114 are arranged in curved or arched lines. The pointer arm 104 has a contact point 115 with a spring coil 116 and connected by a fine wire 117. The curvature of the humidity readings for the same temperatures are made on an arc corresponding to the swing of the pin end 115 as it would move across the chart in accordance with different humidity conditions.

The drum or chart may be mounted in any suitable manner. However, this is illustrated as having a head 120, note particularly Fig. 3, this head having an opening 121 with a close fit on the drum shaft 122. At the opposite end there is a second head 123 fastened by a set screw 124 or the like to the shaft. The shaft has its opposite ends of reduced diameter as at 125. At one end this fits in a journal 126 in the vertical side 13 of the frame 12. The opposite end is journaled in a rotatable bearing sleeve 127 mounted for rotation in the other wall 13 of the frame and on this journal there is an adjusting disc 128 preferably having a knurled periphery and positioned adjacent the head 123 to allow a finger engagement with this knurled disc.

The linear temperature thermostats 130 include one or more bimetallic spiral coils 131 the outer end 132 of which is secured to a pin 133 such pin projecting from the disc 128 and parallel to the shaft 122. The center convolution 134 is secured to the shaft 122. Therefore, the disc 128 may be rotated so that the temperatures on the chart fall in the correct position when a test is made in setting up the instrument. This disc 128 has a friction mounting preventing its accidental turning, therefore, as the outer ends of the thermostatic coils are held in a fixed position any expansion or contraction due to changes in air temperature causes rotation of the shaft 122 and hence of the drum 111 with the chart.

This gives an indication of the changes of temperature independent of the humidity.

If the device is merely to be used as an indicator of relative humidities at different temperatures when the instrument is properly set up and calibrated, the pointer tip 115 will register with a humidity-identifying numeral for the particular air temperature obtained by the action of the temperature thermostat assembly 130. Then presuming the humidity should change while the temperature remained constant, the pointer 104 will swing in an arc and indicate different humidities. There also may be the combination action of changes in temperature accompanied by changes in humidity which will be indicated by the conjoined action of the pointer tip on the chart of the drum.

Where I desire to give an electric signal of the humidity at particular temperatures or to operate various machines to regulate or control humidity, I may incorporate electrical equipment for instance as shown in the diagram of Fig. 6. In this illustration a power supply line 150 is illustrated as having leads 151 and 152. If these have an alternating current supply a rectifier 153 is included. One of the leads 154 has a brush 155 contacting a curved or circular contact element 156 connected by a lead wire 157 to the end or pointer wire 115. This lead extends along the pointer arm 104. A first pair of conductor wires 158 and 159 are attached to the drum and extend across the chart in a diagonal manner, each wire being of such configuration that it registers with numerals indicating substantially the same humidity. For this construction it is preferable that the drum be made of insulating material, the wires being secured to the drum by having inwardly turned ends 160 secured to the drum. If desired a second set of wires 161 and 162 may be located on the drum for a different set of humidity values. Each pair of wires thus define a humidity range, one wire for instance may define the maximum allowable humidity values and the other wire of the pair, the other humidity value. Each of the pair of wires 158, 159, 160, 161 and 162 are connected to leads 163 and 164 which may be mounted on the inside of the drum and extend to circular conducting discs 165 and 166 mounted on the shaft 122, these discs being insulated from the shaft. There are two brushes 167 and 168 mounted in a fixed position and engaging these conducting discs or rings.

One of these brushes, for instance the brush 167, has a lead 170 to an electro-magnet 171 having the winding 172, the return being by the connection 173 to the power line 151. The opposite brush 168 is illustrated as having a connecting lead 175 to a second electro-magnet 176, this having the winding 177 with a return lead 178 to the return wire 151, thus in accordance with the position of the pointer arm 104 and its pin end 115, a contact may be made for instance with conductor 158 or conductor 159 and thus energize either the electro-magnet 171 or the other electromagnet 176.

These magnets form part of a relay, both being illustrated as similar and designated 180 including an armature switch 181 having the make and break contacts 182, connections 183 through a battery or similar source of power 184 to an electric motor or the equivalent 185, the return to the switch being by the lead 186. It will thus be seen that my equipment with the mechanical operation of the bi-metallic temperature responsive movement of the chart and also the bi-metallic response of the pointer arm to the humidity, that I may in addition to giving the indications of the humidity by the pointer end over the chart, use the instrument to control through a relay or the like various electrical appliances which in thier turn may actuate or control a humidity regulation or temperature regulation. By having the pairs of conductors positioned over the chart, the action is confined to a maximum and a minimum range of humidities for changing temperatures. Thus an accurate control of the humidity in a room or the like where the instrument is installed may be obtained. It is manifest that if desired the conducting wires may be inserted or mounted on a drum or the equivalent, omitting the chart as in some cases it is desired to have the humidity control without persons observing the humidity indication. By having a plurality of sets of conductors mounted on the drum or over the chart, it will be seen that the same drum and other equipment may be utilized for an entirely different humidity range control.

In certain of the claims I have designated the thermometric elements responsive to temperature and humidity as mechanical in contradistinction to those which may be electrical or partly electrical such as in my patent above identified.

Various changes may be made in the details of the construction without departing from the spirit or scope of the invention as defined by the appended claims.

I claim:

1. In a device as described, the combination of a pivotally mounted gear segment, a mechanical thermometric element in the form of a spiral coil having one end connected to said segment, a micrometer adjustment for the opposite end, a wick with means to dampen said wick associated with said element to influence the action of said element in relation to the air humidity, a second segmental gear meshing with the first gear and pivotally mounted, a pointer arm extending from the second gear and having a pointer means on the end thereof.

2. In a device as described and claimed in claim 1, a rotatable shaft, a cylindrical means with a chart mounted thereon, the chart having indicia of temperatures and relative humidities, a second thermometric element in the form of a spiral with one end connected to the shaft, a setting disk rotatably mounted on the axis of the shaft, a pin extending therefrom and the outer end of the second thermo-metric spiral element being connected to the pin, the chart and the pointer end being relatively positioned for the pointer end to move over the chart and thus with the rotation of the shaft and the chart designate various humidity values for different temperatures.

3. In a device as described, the combination of a housing and cover structure with a water reservoir mounted therein, a face plate structure located on the front of the reservoir, a first thermo-metric element including a spiral bi-metallic coil, a pivoted gear segment connected to one end of the coil, a micrometer screw adjustment for the opposite end of the coil, a second segmental gear having a pivotal mounting on the plate and meshing with the first gear, a pointer arm extending from the second gear and having a pointer end, a wick extending into the reservoir and connected with the bi-metallic coil to maintain said coil moist and a movable chart with means for operating same in relation to changes of air temperature, the pointer end of the pointer and the chart being positioned for the pointer end to move over the chart.

4. In a device as described and claimed in claim 3, the chart and the means to operate same including a shaft rotatably mounted in the cover structure and located at right angles to the pivots of the segmental gears, a cylinder connected to the shaft and having a chart mounted thereon, such chart having indicia for temperatures and relative humidities, a setting disk rotatably mounted on the axis of the chart and having a setting pin thereon, a second bi-metallic thermometric element having one end connected to the setting pin, said element being wound in a spiral coil and having its opposite end connected to the said shaft whereby the expansion and contraction of the second thermo-metric element rotates the shaft and hence the chart.

5. In a device as described, the combination of a first mechanical thermometric element responsive to changes of air humidity in conjunction with changes of air temperature, a pivotally mounted pointer arm with a pointer end operatively connected to said element whereby the pointer is moved with its pointer end describing an arc, a rotatable shaft, a cylindrical means with a chart mounted thereon, the chart having indicia of temperatures and relative humidities, a second mechanical thermometric element in the form of a spiral with one end connected to the shaft, a setting disk rotatably mounted on the axis of the shaft, a pin extending therefrom and the outer end of the second thermometric spiral element being connected to the pin, the chart and the pointer end being relatively positioned for the pointer end to move over the chart and thus with the rotation of the shaft and the chart designate various humidity values for different temperatures.

6. In a device as described, the combination of a first and a second mechanical thermo-metric element each responsive to expansion and contraction by changing temperatures, means to influence one of said elements by the evaporation of moisture in conjunction with the surrounding temperature, the other element being influenced solely by the changes of the surrounding temperature, a first indicator means including a pointer, a second indicator means including a bodily movable chart-like device with means indicating substantially constant humidity values for changing temperatures, means to actuate the pointer by one of the thermo-metric elements, means to actuate the chart by the other element, the pointer and the chart being adapted to register and thus give an indication of the humidity values through various ranges of temperatures, the chart having one or more electrical conductors mounted thereon, each conductor being positioned to register with constant humidity values through a range of temperatures, a contact element on the pointer and means to establish an electric circuit through the pointer and either of the conductors when the pointer contacts therewith.

7. In a device as described, the combination of a movable frame having an indicator chart thereon showing substantially constant humidity values for various changes of temperature, a pivoted pointer having a pointer end positioned to register with the chart, a first mechanical thermo-metric element expanding and contracting in accordance with changes of air temperature, a second mechanical thermo-metric element having a water moistened absorbent wick and expanding and contracting in accordance with changes of air humidity at varying temperatures, an operative connection between one element and the movable frame and the other element and the pointer whereby during changes of air temperature and air humidity the movement of the frame with the chart and the pointer being adapted to register and thus designate the specific humidity at a specific temperature, the indicator chart having an electrical conductor mounted on the chart shaped to conform to constant humidity values through a range of temperature, the pointer having an electrical connection and a contact end to engage the said conductor when registering therewith.

8. In a device as described, the combination of a housing and cover structure with a fixed plate structure, a first mechanical thermo-metric element including a spiral bi-metallic coil, a pivoted gear segment connected to one end of the coil, a second segmental gear having a pivoted mounting on the plate and meshing with the first gear, a pointer arm extending from the second gear and having a pointer end, a wick with a dampening means connected with the bi-metallic coil to maintain the coil moist, a movable chart, the pointer end of the pointer and the chart being positioned for the pointer end to move over the chart, the chart and means to operate same including a shaft rotatably mounted in the cover structure and located at right angles to the pivots of the segmental gears, a cylinder connected to the shaft and having the chart mounted thereon, such chart having indicia for temperatures and relative humidities, a setting disk rotatably mounted on the axis of the chart and having a setting pin thereon, a second bi-metallic thermometric eelment having one end connected to the setting pin, said element being wound in a spiral coil and having its opposite end connected to the said shaft whereby the expansion and contraction of the second thermo-metric element rotates the shaft and hence the chart.

9. In a device as described the combination of a first and a second thermo-metric element responsive to changes of temperature, means to influence one of the elements by the relative humidity of the air, the other being influenced only by changes of air temperature, a movable assembly including a first movable indicating element and a second bodily movable indicating means to designate a range of changing relative humidity values for a series of constant temperatures and changing temperatures for a series of constant relative humidity values, means to actuate one of the indicators by one of the elements and the other indicator by the other element, said indicators being adapted to co-register and indicate relative humidity values for different temperatures, a second indicating means having one or more electrical conductors positioned for each conductor to represent a certain constant relative humidity value for varying temperatures and means to close an electric circuit when the two indicator means register with a conductor.

10. In a device as described, the combination of a first mechanical thermometric element with an absorbent wick and means to moisten said wick to develop a response to the relative humidity changes of varying temperatures, a pivoted arm forming a pointer operatively connected to said first thermometric element to move in an arc at right angles to its pivot, a second mechanical thermometric element positioned to be responsive to changes of air temperature, a chart having designations of temperature and relative humidity thereon, means interconnecting the second thermometric element and the chart to move the chart in relation to the pointer whereby the pointer end moves over the chart giving an indication of temperatures and relative humidities at such temperatures, the chart having a pair of substantially parallel conductors mounted thereon, each positioned to indicate a different set of constant humidity values for different temperatures, the pointer having an electrical connection and a pointer end positioned to react with either of the conductors and means to complete an electric circuit through the pointer and its outer end and either of the conductors constructed and adapted to operate a humidity control means at the extreme of the humidity values represented by the conductors.

WILLIAM F. ALDER.